(12) United States Patent  (10) Patent No.: US 7,878,164 B2
Borraccia et al.  (45) Date of Patent: Feb. 1, 2011

(54) APPARATUS FOR PREVENTING LEAKAGE ACROSS ROTOR VANES IN A VANE-TYPE CAMSHAFT PHASER

(75) Inventors: Dominic Borraccia, Spencerport, NY (US); Natalie G. Payne, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 288 days.

(21) Appl. No.: 12/151,589

(22) Filed: May 7, 2008

(65) Prior Publication Data

US 2008/0289596 A1    Nov. 27, 2008

Related U.S. Application Data

(63) Continuation-in-part of application No. 11/638,595, filed on Dec. 13, 2006, now abandoned.

(51) Int. Cl.
 *F01L 1/34* (2006.01)
(52) U.S. Cl. .................. 123/90.17; 123/90.15; 464/160

(58) Field of Classification Search .............. 123/90.15, 123/90.16, 90.17, 90.18; 464/1, 2, 160
See application file for complete search history.

(56) References Cited

U.S. PATENT DOCUMENTS 7,444,968 B2 * 11/2008 Lancefield et al. ....... 123/90.17

* cited by examiner

*Primary Examiner*—Ching Chang
(74) *Attorney, Agent, or Firm*—Thomas N. Twomey

(57) ABSTRACT

In a first embodiment of a camshaft phaser, the rotor is split along an equatorial plane thereof, defining first and second rotor portions. A resilient seal is compressively disposed between the rotor portions to prevent leakage therebetween and to urge the rotor vanes against the cover plate and sprocket surfaces to prevent leakage around the vanes. Preferably, the seal includes radial seal elements to seal against the stator wall. Preferably, pressurized hydraulic fluid can enter between the first and second rotor portions and thereby assist the resilient seal in urging the rotor portions apart. In a second embodiment, the rotor is not split, and a resilient seal is provided on at least one axial face of the rotor vanes to seal the rotor vanes against the cover plate and sprocket surfaces.

12 Claims, 5 Drawing Sheets

APPARATUS FOR PREVENTING LEAKAGE ACROSS ROTOR VANES IN A VANE-TYPE CAMSHAFT PHASER

RELATED APPLICATIONS

This application is a continuation-in-part of U.S. patent application Ser. No. 11/638,595 filed Dec. 13, 2006 now abandoned and entitled "APPARATUS FOR PREVENTING LEAKAGE ACROSS ROTOR VANES IN A VANE-TYPE CAMSHAFT PHASER", which is incorporated herein by reference.

TECHNICAL FIELD

The present invention relates to camshaft phasers for varying the timing of combustion valves in internal combustion engines; more particularly, to vanes and stators within camshaft phasers; and most particularly, to means for preventing leakage of hydraulic fluid between the advance and retard chambers within a vane-type camshaft phaser.

BACKGROUND OF THE INVENTION

Vane-type camshaft phasers for varying the timing of combustion valves in an internal combustion engines are well known. In a vane-type phaser, timing advance and retard chambers are formed within the phaser between inwardly-extending lobes of a generally cylindrical stator and outwardly-extending vanes of a rotor concentrically disposed within the stator. Typically, a camshaft phaser is disposed on the front of an engine and includes an oil control valve for controlling oil flow into and out of the chambers. The valve receives pressurized oil from an oil gallery in the engine block and selectively distributes oil to controllably vary the phase relationship between the engine's camshaft and crankshaft.

A known problem with prior art vane-type phasers is leakage of oil past the vanes between the advance and retard chambers. Such leakage can result in slow and imprecise response of a phaser. In prior art phasers, the inner and outer radial interfaces between the rotor vanes and the stator walls are sealed by resilient wipers disposed in either the vanes or the stator. However, the axial interfaces between the rotor vanes and the phaser front cover plate surface on one side, and between the rotor vanes and the rear cover plate surface on the other side, depend solely upon tight clearances for sealing. Specifically, tight tolerances for length, parallelism, and flatness are required on the mating surfaces to minimize leakage across the vanes; however, to permit rotation of the rotor within the stator, the axial height of the rotor vanes must be slightly less than the axial height of the stator, so that some leakage across this length gap is inherent. Over time, the height difference may increase with wear, resulting in a corresponding increase in leakage and decrease in phaser performance.

What is needed in the art is means for positive sealing of the gap at the axial faces of rotor vanes in a vane-type camshaft phaser.

It is a principal object of the present invention to prevent hydraulic leakage between the advance and retard chambers in a vane-type camshaft phaser.

SUMMARY OF THE INVENTION

Briefly described, in a vane-type camshaft phaser, the vanes of the rotor are provided with resilient seal elements that move with the rotor for urging the rotor into positive sealing contact with the axial mating surfaces of the rotor chamber. In a first embodiment, the rotor of a camshaft phaser is split along an equatorial plane thereof, defining first and second rotor portions. At least one of the rotor portions is axially slidable within the stator, defining a portion gap between the rotor portions, but is constrained from rotational motion independent of the other rotor portion. Resilient sealing means, such as a specially formed elastomeric seal, is disposed between the first and second rotor portions. In a relaxed-seal state, the axial height of the rotor is greater than the axial height of the rotor chamber in the stator such that the seal is compressed upon assembly of the phaser. The compressed seal not only prevents leakage across the portion gap but also urges the axial faces of the rotor vanes against their mating chamber surfaces to prevent leakage past the vanes. The radial gap between the vanes and the stator may be sealed conventionally with separate seal members, or the specially-formed seal may include radial seal elements which replace the prior art radial seals. Preferably, the axial resilient seal is arranged such that pressurized hydraulic fluid can enter the portion gap and thereby assist the resilient seal in urging the rotor portions axially against the cover plate and sprocket wheel mating surfaces.

Alternatively, in a second embodiment for positive sealing of the gap at the axial faces of rotor vanes, a resilient seal is provided on at least one axial face of the rotor vanes. The axial face of the rotor vanes is adapted to receive the resilient seal so that the seal moves with the rotor vanes relative to the stator. As in the first embodiment, in a relaxed-seal state the axial height of the rotor and seal is greater than the axial height of the rotor chamber in the stator such that the seal is compressed upon assembly of the phaser. The radial gap between the vanes and the stator may be sealed conventionally with separate seal members, or the specially-formed seal may include radial seal elements which replace the prior art radial seals. The compressed seal element not only seals against leakage across its own vane surfaces but also urges the opposite axial faces of the rotor vanes against their mating phaser surfaces to prevent leakage across those surfaces as well.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
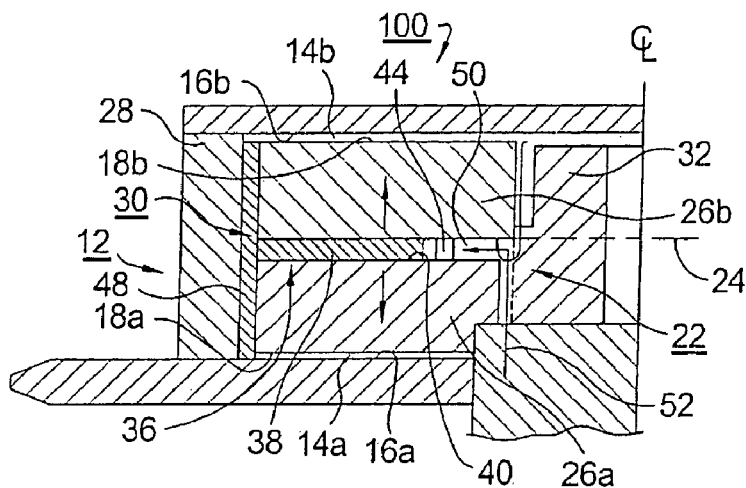
FIG. 1 is an elevational cross-sectional view of a portion of a camshaft phaser having a resilient axial seal in accordance with the invention, a first embodiment thereof comprising a split rotor.
Figure 2:
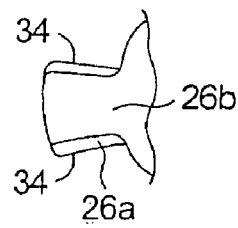
FIG. 2 is a plan view showing first and second portions of a split rotor vane.
Figure 3:
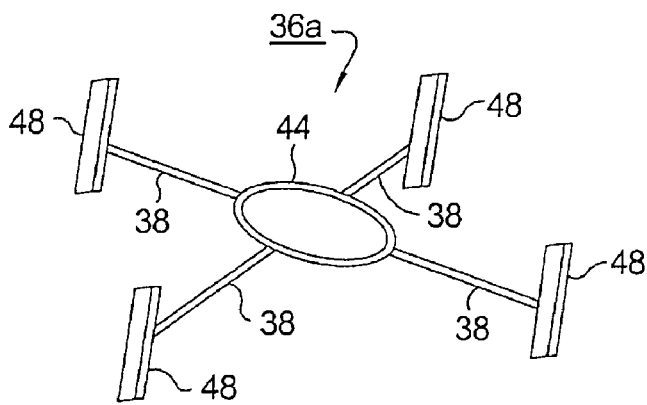
FIG. 3 is an isometric view of a first embodiment of a resilient seal for use in the phaser shown in FIG. 1.
Figure 4:
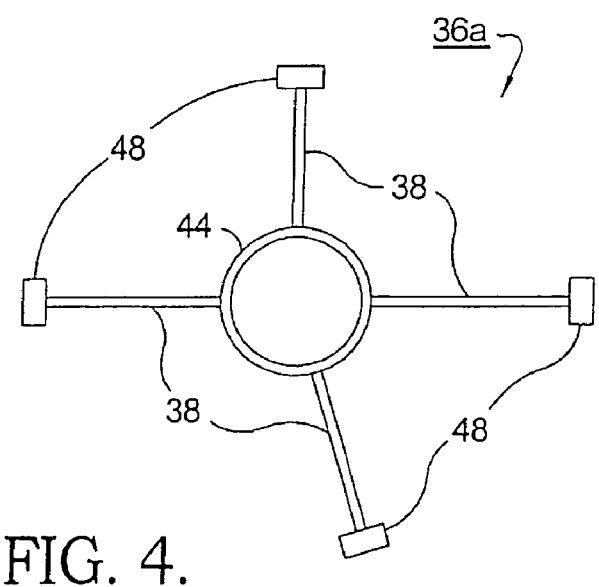
FIG. 4 is a plan view of the resilient seal shown in FIG. 3.
Figure 5:
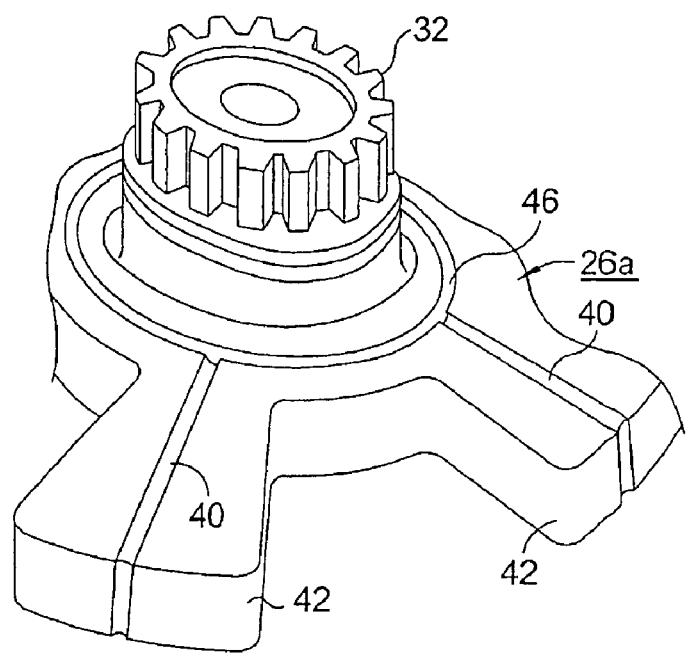
FIG. 5 is an isometric view of the first rotor portion shown in FIG. 1.
Figure 6:
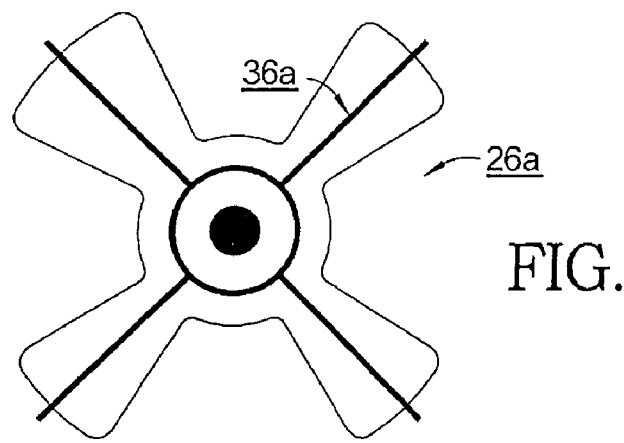
FIG. 6 is a plan view of the first resilient seal embodiment mounted on a first rotor portion.
Figure 7:
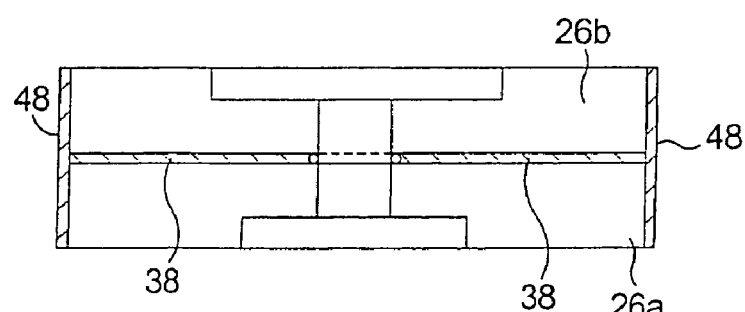
FIG. 7 is a schematic elevational cross-sectional view of an assembled rotor in accordance with the first resilient seal embodiment shown in FIG. 6.

Referring to FIGS. 1 through 7, a first embodiment 100 of a camshaft phaser 12 provides for positive sealing of gaps 14a, 14b formed between rear cover plate surface 16a and front cover plate face 16b, respectively, and the axial faces 18a, 18b of a rotor vane. The rotor 22 of phaser 12 is split along an equatorial plane 24 thereof, defining first and second rotor portions 26a, 26b. At least one of the rotor portions (portion 26b in the illustrated example) is axially slidable within the phaser stator 28, defining a portion gap 30 along plane 24 between the rotor portions 26a, 26b, but is constrained from rotational motion independent of the other rotor portion. A mechanical connection, for example a male splined hub 32 on first rotor portion 26a (FIG. 5) can mate with a female splined hub (not visible in FIG. 5) on rotor portion 26b such that rotor portion 26b can slide axially within stator 28 as may be required to seal, as described below, but must rotate with first portion 26a. Preferably, one vane portion, e.g. first portion 26a as shown in FIG. 2, is formed to be slightly broader angularly than the corresponding other vane portion 26b to define positive advance and retard stops 34 within the stator.

Resilient seal 36, such as a specially formed elastomeric seal 36a, is disposed between first and second rotor portions 26a, 26b. Seal 36a comprises radial elements 38, received in radial grooves 40 formed in the vanes 42 of rotor portion 26a, and an inner ring 44 received in an annular groove 46. Preferably, resilient seal 36a also comprises radial wipers 48 for sealing the outer ends of the rotor portions against the inner surface of stator 28. Wipers 48 may be attached to ends of seals 36a, as a single piece construction, or formed first as a separate piece before assembly.

Figure 8:
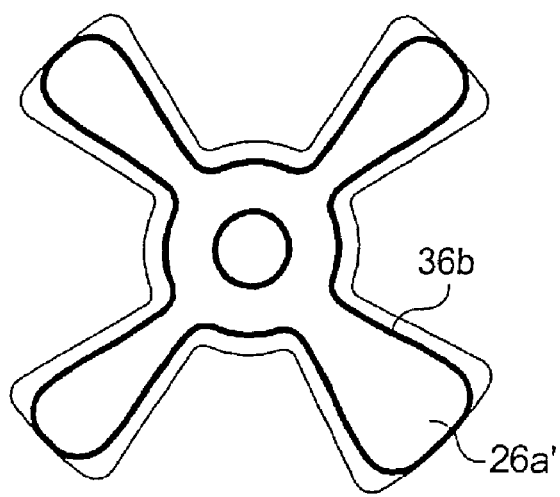
FIG. 8 is a plan view of a second embodiment of a first rotor portion and resilient seal.

Referring to FIG. 8, a second embodiment of a specially formed elastomeric seal 36b comprises a continuous seal element disposed in a continuous groove formed along the periphery of the face of a rotor portion 26a'.

In a non-compressed state, the axial height of the two rotor portions 26a,26b plus the height of resilient seal 36a,36b is greater than the axial height of the rotor chamber in the stator 28 between surfaces 16a, 16b such that the seal is compressed upon assembly of the phaser. The compressed seal not only prevents leakage across portion gap 30 between rotor portions 26a, 26b but also urges the axial faces of the rotor vanes against their mating cover plate surfaces 16a, 16b to prevent leakage around the vanes. The radial gap between the vanes and the stator may be sealed conventionally with separate seal members, or the specially-formed seal may include radial wipers 48 to replace the prior art radial wipers or seals.

Preferably, the axial elastomeric seal is arranged such that pressurized hydraulic fluid 50 can enter portion gap 30 inboard of the retard and advance chambers, for example, via an axial feed 52 into the splined area within ring 44 as shown in FIG. 1, and thereby assist the resilient seal in urging the rotor portions axially apart against the cover plate mating surfaces 16a, 16b.

Figure 9:
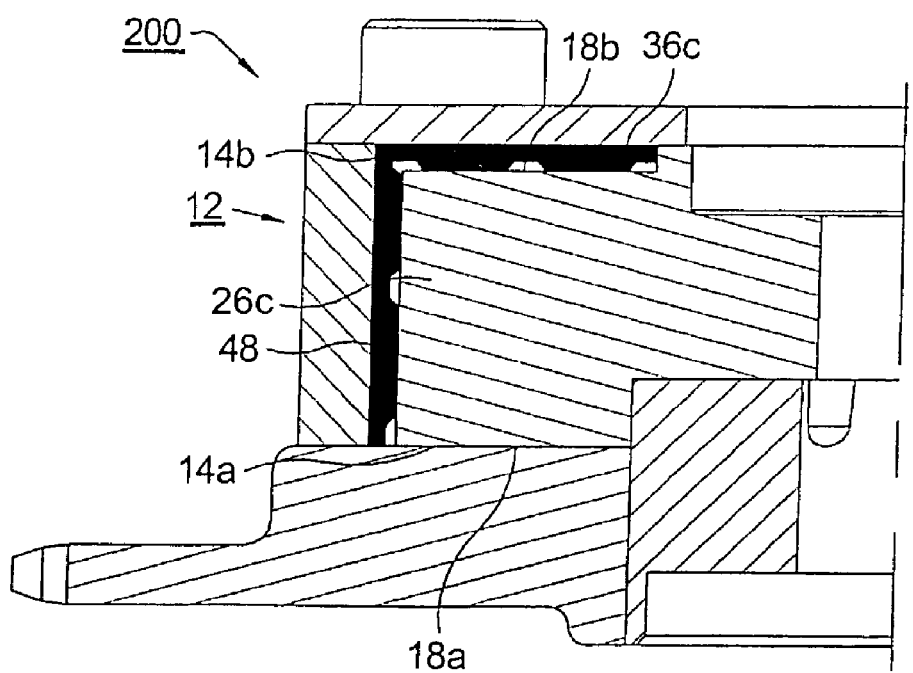
FIG. 9 is an elevational cross-sectional view of a portion of a camshaft phaser having a resilient axial seal in accordance with the invention, a third embodiment thereof comprising a seal along one axial rotor face.
Figure 10:
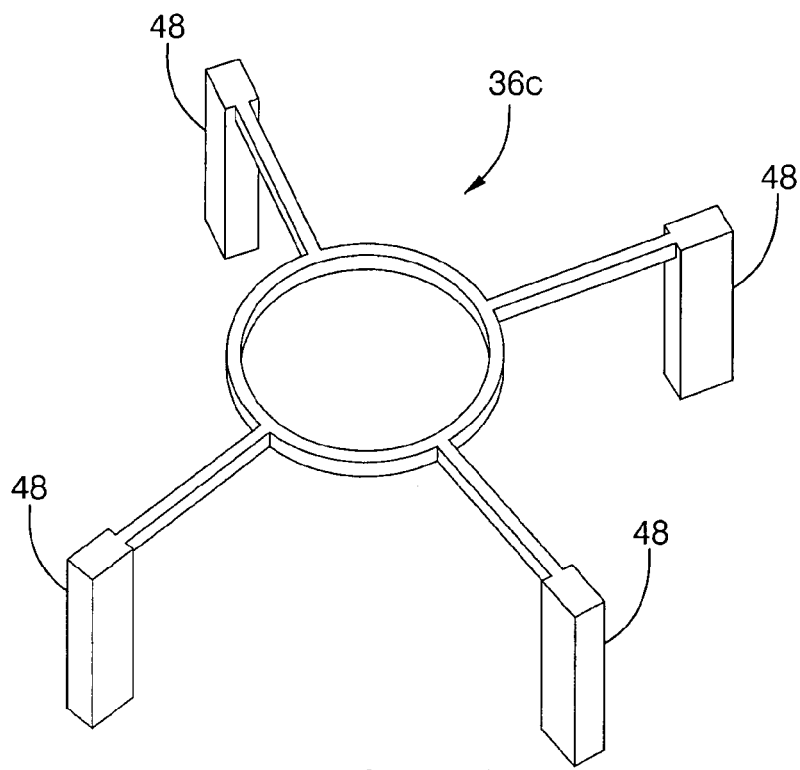
FIG. 10 is an isometric view of a resilient seal for use in the camshaft phaser shown in FIG. 9.
Figure 11:
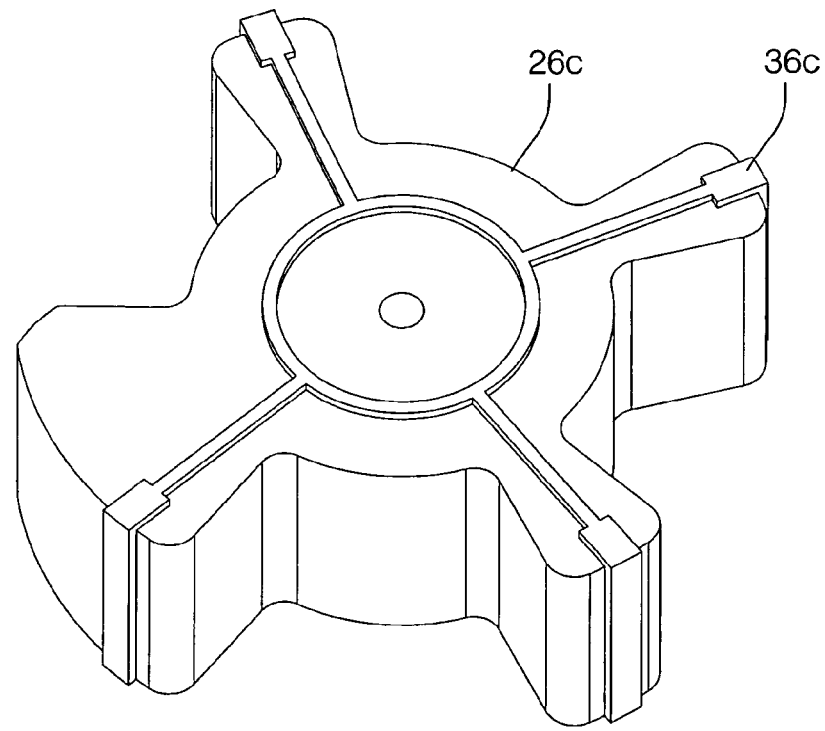
FIG. 11 is an isometric view of a rotor with the resilient seal shown in FIG. 10.

Alternatively, referring to FIG. 9, in a third embodiment 200 for positive sealing of gaps 14a, 14b at the axial faces 18a, 18b of rotor 26c in a vane-type camshaft phaser 12, an elastomeric seal 36c is provided on at least one axial face of the rotor 26c, which is not equatorially split as the rotor was in embodiment 100. In this embodiment, rotor 26c is adapted to receive elastomeric seal 36c so that the elastomeric seal moves with the rotor relative to the rotor chamber. Referring to FIG. 10, as in first embodiment 100, seal 36c preferably includes radial wipers 48 to replace prior art radial wipers or seals. As indicated in FIG. 11, in a non-compressed state, the elastomeric seal 36c when installed to the rotor 26c protrudes above the axial face of the rotor, such that the axial height of the rotor and seal is greater than the axial height of the rotor chamber in the stator. Upon assembly of the phaser, the seal contacts a cover plate surface and is compressed. The compressed seal element not only seals against leakage across its own vane surfaces but also urges the opposite axial faces of the rotor vanes against their mating phaser surfaces to prevent leakage across those surfaces.

Figure 12:
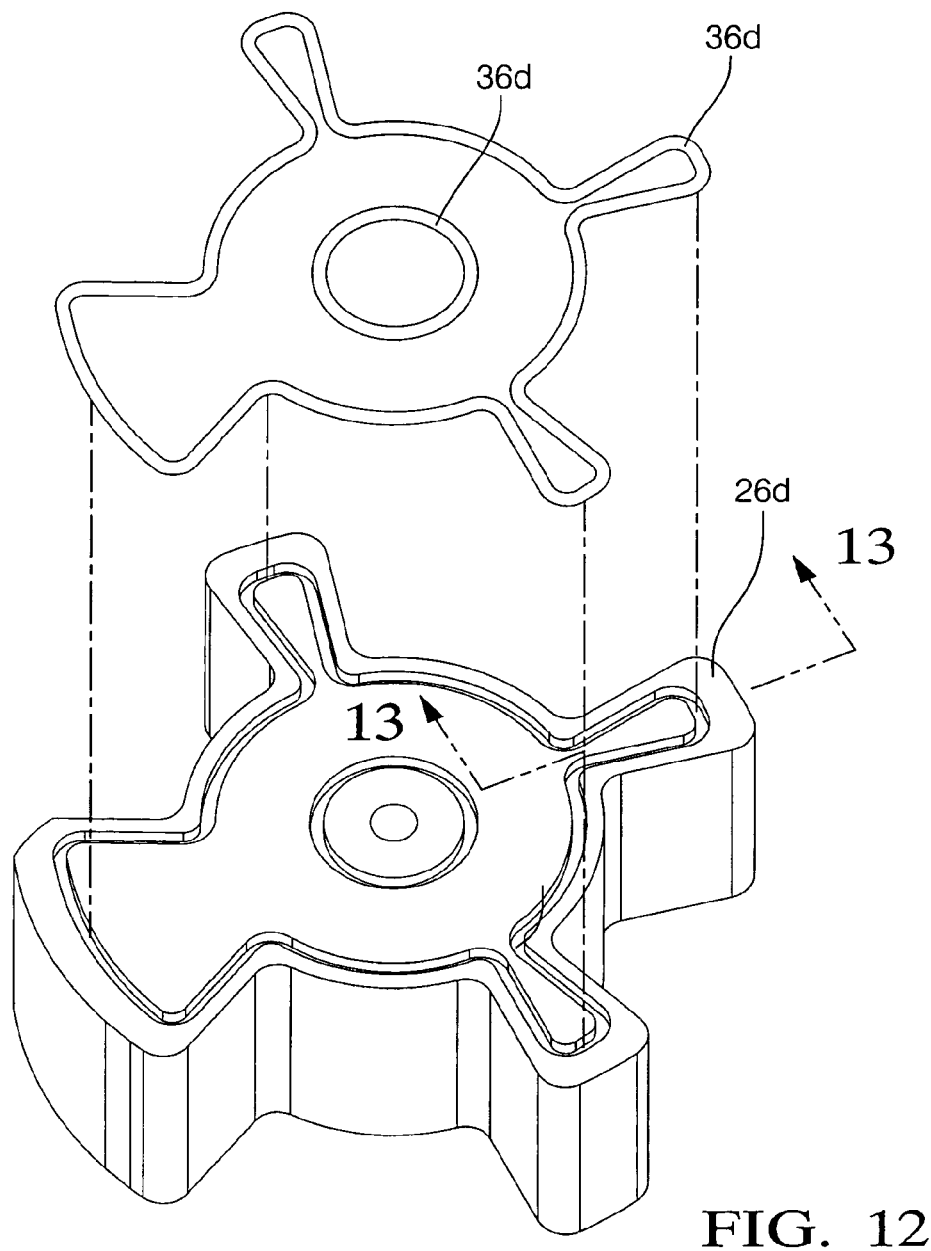
FIG. 12 is an exploded isometric view of an alternate embodiment of a camshaft phaser having a resilient axial seal along one axial rotor face.
Figure 13:
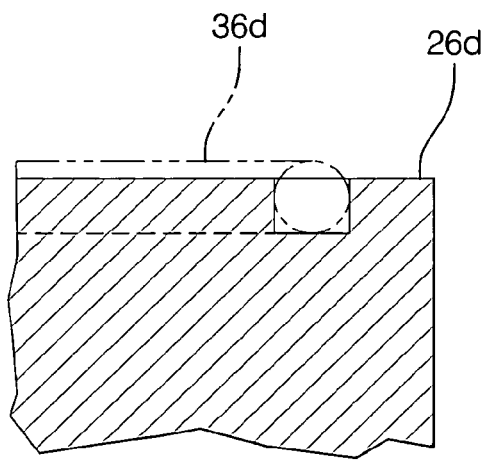
FIG. 13 is a partial sectional view of FIG. 12.

FIG. 12 discloses an exploded view of alternate embodiment of the invention. This embodiment also uses a rotor 26d that is not equatorially split and that has an axial face adapted to receive an elastomeric seal 36d so that the elastomeric seal moves with the rotor relative to the rotor chamber. In this embodiment, the elastomeric seal 36d is a continuous element disposed along the periphery of all of the vanes. The camshaft phaser may also comprise an elastomeric O-ring 36d'. As indicated in FIG. 13, in a non-compressed state, the elastomeric seal 36d when installed to the rotor 26d protrudes above the axial face of the rotor, such that the axial height of the rotor and seal is greater than the axial height of the rotor chamber in the stator. Upon assembly of the phaser, the seal contacts a cover plate surface and is compressed. The compressed seal element not only seals against leakage across its own vane surfaces but also urges the opposite axial faces of the rotor vanes against their mating phaser surfaces to prevent leakage across those surfaces.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A camshaft phaser comprising:
   a) a stator having radial walls and bounded by a first cover plate on a first side and by a second cover plate on a second side to define a chamber therewithin, said chamber having a first height between said first and second cover plates;
   b) a rotor disposed within said chamber and having a hub and having a plurality of spaced-apart vanes extending outwards from said hub toward said stator walls of said chamber; and
   c) a resilient seal element provided on and moveable with an axial surface of said spaced-apart vanes for preventing passage of hydraulic fluid past said vanes, wherein the combined heights of said resilient seal element when in a non-compressed state and said rotor is greater than said first height such that said resilient seal element is compressed during assembly of said phaser.

2. A camshaft phaser in accordance with claim 1 wherein said resilient seal element further comprises a radial seal between at least one of said rotor vanes and said stator.

3. A camshaft phaser in accordance with claim 1 wherein said resilient seal element comprises a continuous seal element disposed along the periphery of all of said plurality of vanes.

4. A camshaft phaser in accordance with claim 1 wherein said resilient seal element is in contact with one of said first and second cover plates.

5. A camshaft phaser comprising:
   a) a stator having radial walls and bounded by a first cover plate on a first side and by a second cover plate on a second side to define a chamber therewithin, said chamber having a first height between said first and second cover plates;
   b) a rotor disposed within said chamber and having a hub and having a plurality of spaced-apart vanes extending outwards from said hub toward said stator walls of said chamber, wherein said rotor is equatorially divided into a first rotor portion and a second rotor portion defining a portion gap therebetween; and
   c) a resilient seal element disposed in said portion gap to urge said first and second rotor portions axially apart and into sealing contact with said first and second cover plates for preventing passage of hydraulic fluid past said vanes.

6. A camshaft phaser in accordance with claim 5 wherein the combined heights of said resilient seal element when in a non-compressed state and said first and second rotor portions is greater than said first height such that said resilient seal element is compressed during assembly of said phaser.

7. A camshaft phaser in accordance with claim 5 wherein at least one vane of said first rotor portion is angularly broader than a corresponding vane of said second rotor portion.

8. A camshaft phaser in accordance with claim 5 wherein said resilient seal element comprises an O-ring portion disposed in a hub of said rotor and a plurality of radial portions extending from said O-ring portion along each vane of said rotor in said portion gap.

9. A camshaft phaser in accordance with claim 5 further comprising an oil passage for providing pressurized oil into said portion gap to assist said resilient seal element in urging said first and second rotor portions axially apart and into sealing contact with said first and second cover plates.

10. A camshaft phaser in accordance with claim 5 wherein one of said first and second rotor portions includes a first rotational stop mechanism and the other of said first and second rotor portions includes a second rotational stop mechanism for mating engagement therebetween for allowing one of said first and second rotor portions to move axially toward and away from the other of said rotor portions and yet be locked to the other of said first and second rotor portions in angular motion.

11. A camshaft phaser in accordance with claim 10 wherein one of said first and second rotor portions is axially fixed and the other of said rotor portions is slidably disposed for axial motion within said chamber.

12. A camshaft phaser in accordance with claim 10 wherein said first and second rotational stop mechanisms include a splined male hub on one of said first and second rotor portions and a splined female hub on the other.

* * * * *